(12) United States Patent
Dalebout et al.

(10) Patent No.: US 10,207,143 B2
(45) Date of Patent: Feb. 19, 2019

(54) LOW PROFILE COLLAPSIBLE TREADMILL

(71) Applicant: ICON Health & Fitness, Inc., Logan, UT (US)

(72) Inventors: William T. Dalebout, North Logan, UT (US); Dale T. Buchanan, Nibley, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 0 days.

(21) Appl. No.: 14/609,252

(22) Filed: Jan. 29, 2015

(65) Prior Publication Data

US 2015/0209610 A1    Jul. 30, 2015

Related U.S. Application Data

(60) Provisional application No. 61/933,710, filed on Jan. 30, 2014.

(51) Int. Cl.
| | | |
|---|---|---|
| *A63B 21/00* | (2006.01) | |
| *A63B 22/02* | (2006.01) | |
| *A63B 21/005* | (2006.01) | |
| *A63B 21/22* | (2006.01) | |
| *F03G 5/02* | (2006.01) | |

(Continued)

(52) U.S. Cl.
CPC .......... *A63B 22/02* (2013.01); *A63B 21/0051* (2013.01); *A63B 21/154* (2013.01); *A63B 21/225* (2013.01); *A63B 71/0622* (2013.01); *F03G 5/025* (2013.01); *A63B 21/008* (2013.01); *A63B 21/0055* (2015.10); *A63B 21/00069* (2013.01); *A63B 21/0085* (2013.01); *A63B 21/015* (2013.01); *A63B 2071/065* (2013.01); *A63B 2071/068* (2013.01); *A63B 2071/0625* (2013.01); *A63B 2209/00* (2013.01); *A63B 2210/50* (2013.01); *A63B 2220/20* (2013.01);

(Continued)

(58) Field of Classification Search
CPC ..... A63B 22/02; A63B 22/04; A63B 69/0028; A63B 21/22; A63B 21/225; A63B 22/0235; A63B 2022/0271; A63B 2022/0278
See application file for complete search history.

(56) References Cited

U.S. PATENT DOCUMENTS 4,363,480 A * 12/1982 Fisher ................. A63B 21/015
                                                       188/187
4,592,544 A *  6/1986 Smith ................. A63B 22/0605
                                                       482/64

(Continued)

FOREIGN PATENT DOCUMENTS

| CN | 1531451 | 9/2004 |
| CN | 1953787 | 4/2007 |

OTHER PUBLICATIONS

International Search Report issued for PCT/US2015/013586 dated Apr. 13, 2015.

(Continued)

*Primary Examiner* — Nyca T Nguyen
(74) *Attorney, Agent, or Firm* — Ray, Quinney & Nebeker

(57) ABSTRACT

A manually operated treadmill a deck and a tread belt encircling the deck to provide a movable, continuous running surface during operation of the treadmill. Further, the treadmill includes a transmission connecting a flywheel to the tread belt and a resistance unit disposed to adjustably apply a resistance force to the inertial motion of the flywheel.

16 Claims, 8 Drawing Sheets

(51) Int. Cl.
*A63B 71/06* (2006.01)
*A63B 21/008* (2006.01)
*A63B 21/015* (2006.01)

(52) U.S. Cl.
CPC ....... *A63B 2230/06* (2013.01); *A63B 2230/75* (2013.01)

(56) References Cited

U.S. PATENT DOCUMENTS

| | | | |
|---|---|---|---|
| 4,602,779 A | 7/1986 | Ogden | |
| 4,673,177 A * | 6/1987 | Szymski | A63B 21/015 482/119 |
| 4,757,987 A | 7/1988 | Allemand | |
| 4,953,415 A * | 9/1990 | Lehtonen | A63B 21/015 188/77 R |
| 5,897,460 A | 4/1999 | McBride et al. | |
| 6,033,347 A | 3/2000 | Dalebout et al. | |
| 6,261,209 B1 * | 7/2001 | Coody | A63B 22/0023 482/51 |
| 6,302,826 B1 * | 10/2001 | Lee | A63B 22/02 482/51 |
| 6,471,622 B1 | 10/2002 | Hammer et al. | |
| 6,761,667 B1 * | 7/2004 | Cutler | A63B 22/0023 482/51 |
| 6,923,747 B1 | 8/2005 | Chu | |
| 7,192,388 B2 | 3/2007 | Dalebout et al. | |
| 7,862,483 B2 | 1/2011 | Hendrickson et al. | |
| 8,147,385 B2 * | 4/2012 | Crawford | A63B 21/4035 482/52 |
| 8,550,962 B2 * | 10/2013 | Piaget | A63B 22/025 482/52 |
| 2005/0148439 A1 * | 7/2005 | Wu | A63B 22/02 482/54 |
| 2006/0270522 A1 * | 11/2006 | Yonehana | A63B 21/157 482/8 |
| 2007/0270294 A1 * | 11/2007 | Sheets | A63B 21/00192 482/140 |
| 2007/0296313 A1 * | 12/2007 | Wang | A63B 21/0055 310/67 A |
| 2009/0042698 A1 * | 2/2009 | Wang | A63B 22/02 482/54 |
| 2009/0137367 A1 * | 5/2009 | Hendrickson | A63B 21/0051 482/54 |
| 2012/0010053 A1 | 1/2012 | Bayerlein et al. | |
| 2012/0132877 A1 * | 5/2012 | Wang | A63B 22/02 256/59 |
| 2013/0123073 A1 | 5/2013 | Olson et al. | |
| 2013/0237383 A1 * | 9/2013 | Chen | A63B 22/02 482/54 |

OTHER PUBLICATIONS

Search Report Issued in Chinese Patent Application No. 201580012148X dated May 4, 2017.
Machine translated English Abstract of CN1531451A. Sep. 22, 2004.
Machine translated English Abstract of CN1953787A. Apr. 25, 2007.

* cited by examiner

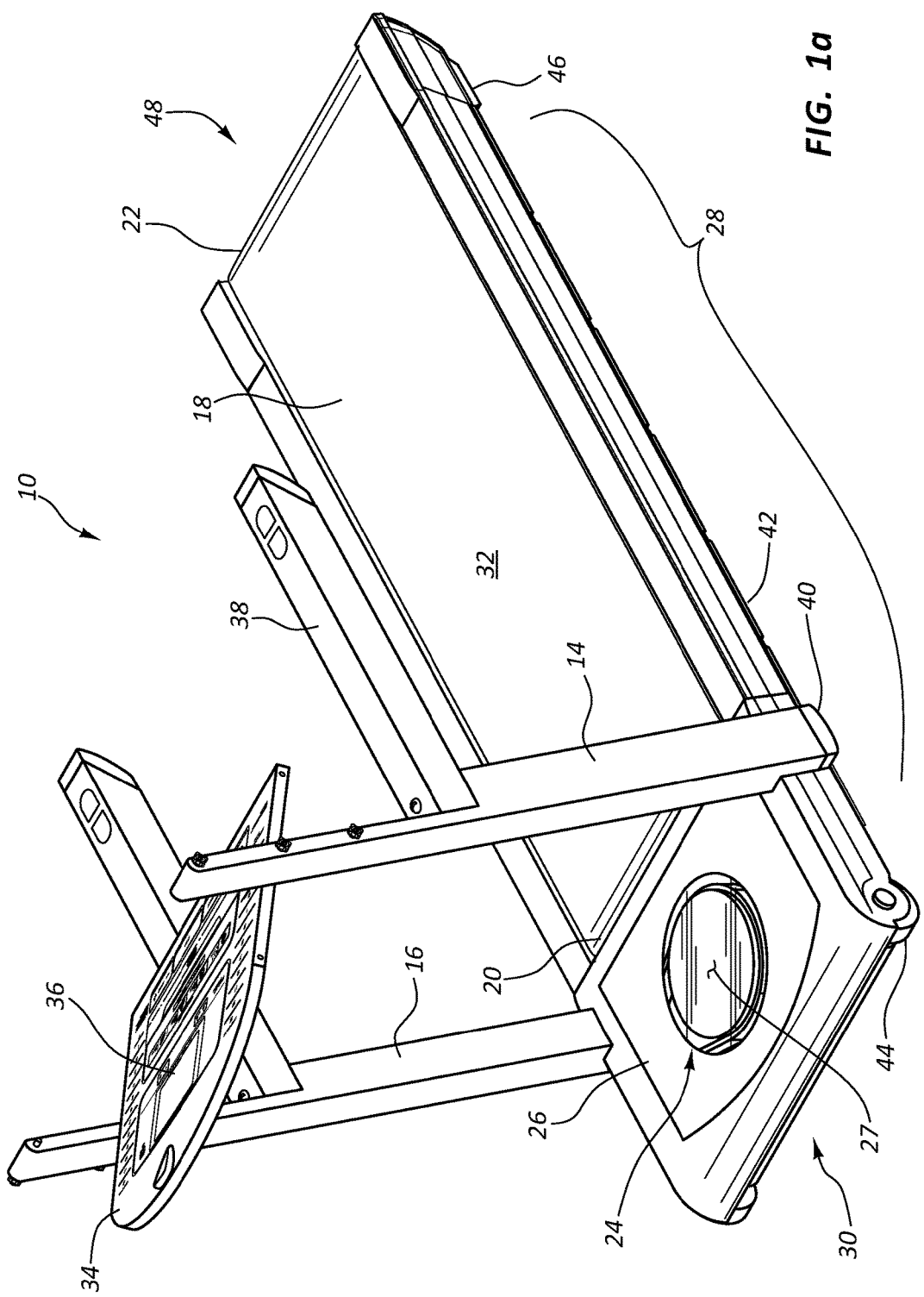

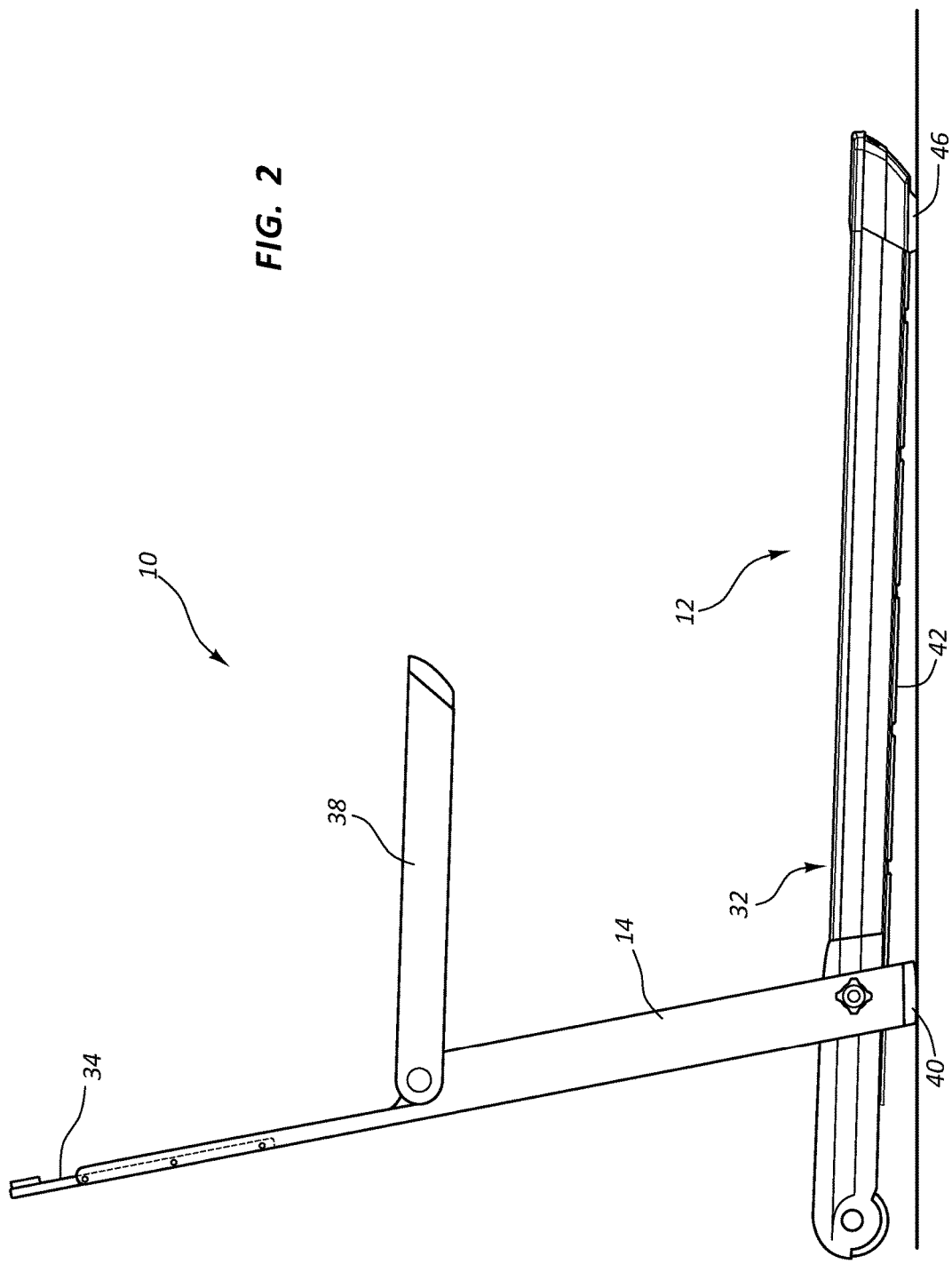

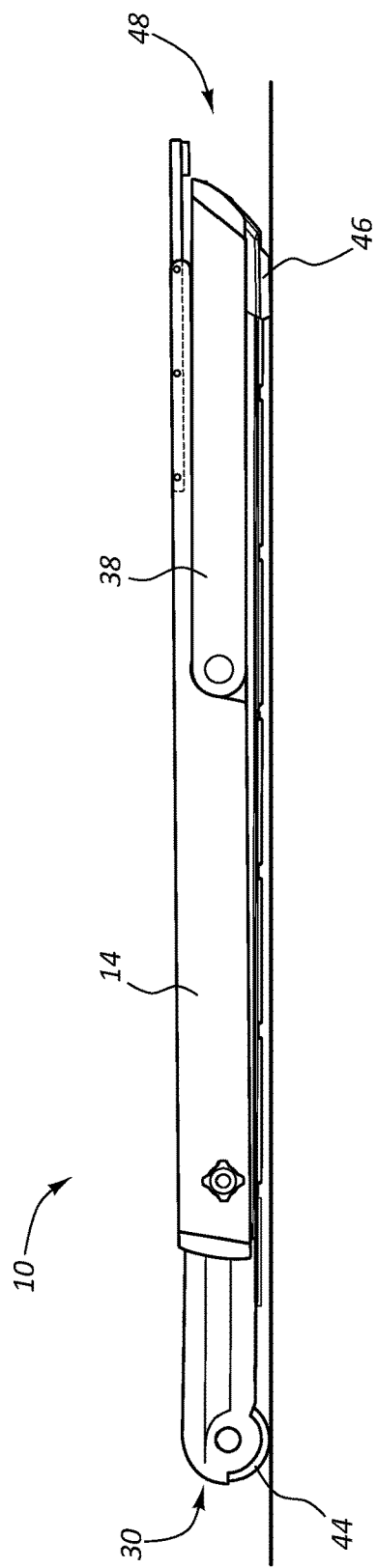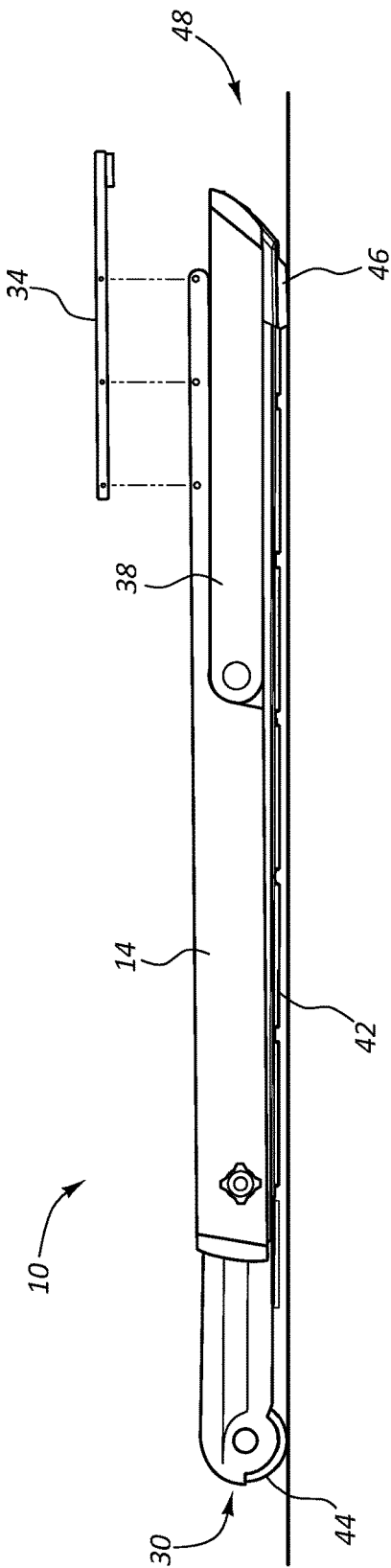

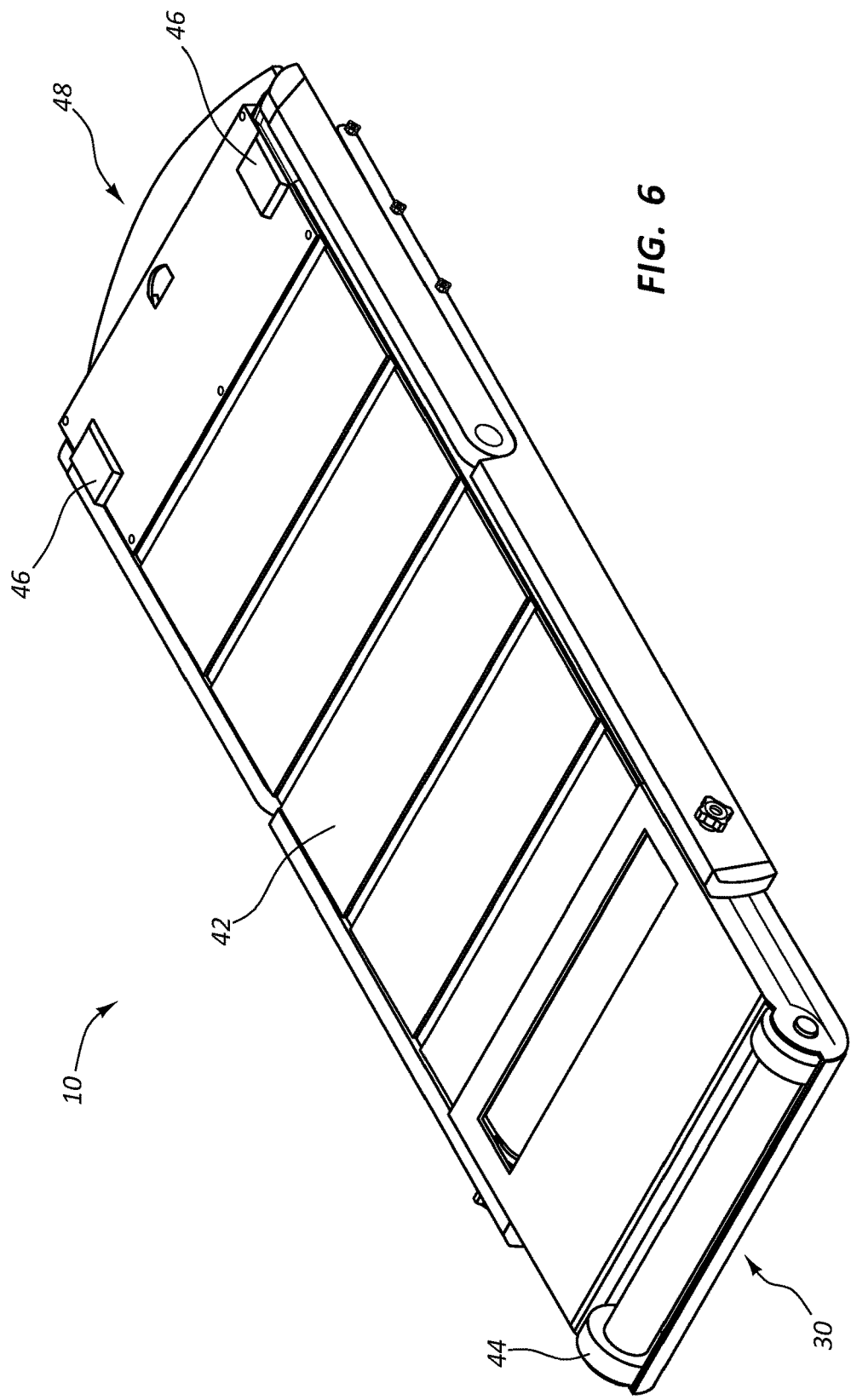

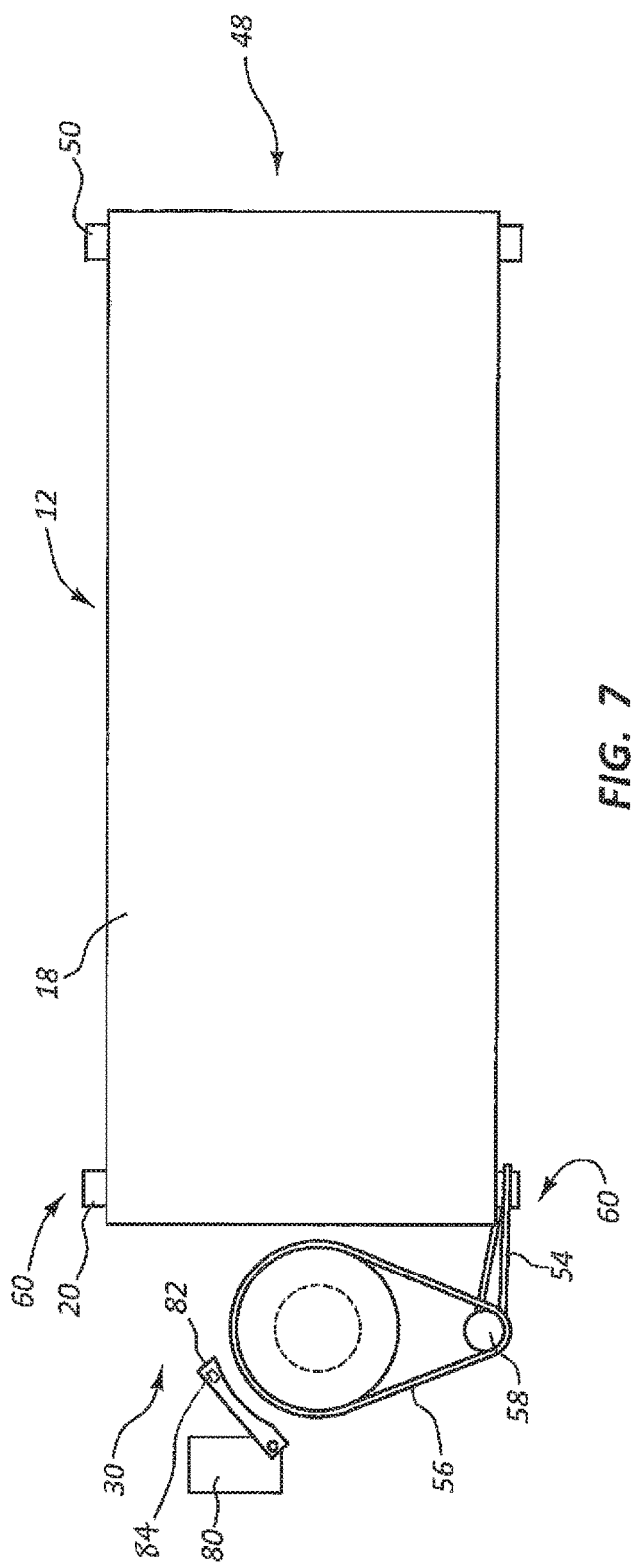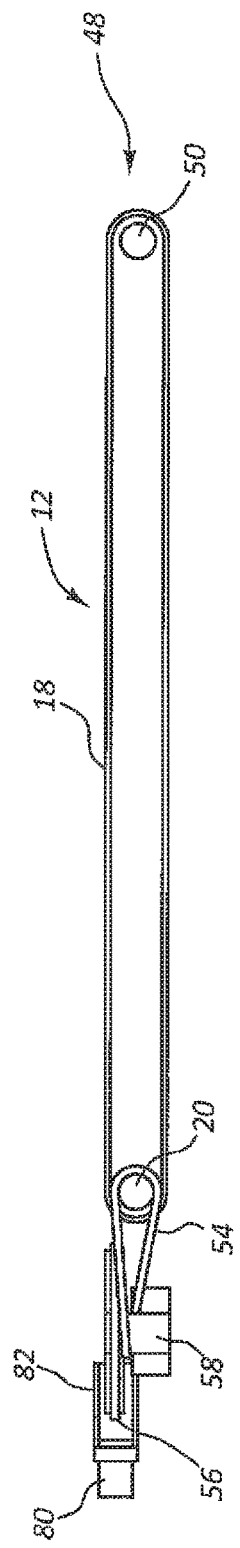
FIG. 7
FIG. 8

LOW PROFILE COLLAPSIBLE TREADMILL

RELATED APPLICATIONS

This application claims priority to U.S. Provisional Patent Application No. 61/933,710 titled "Low Profile Collapsible Treadmill" filed Jan. 30, 2014, which application is incorporated herein by reference for all that it discloses.

BACKGROUND

Running, jogging, and walking have become increasingly popular as being a beneficial activity for losing weight, building muscle, and improving cardiovascular health. Studies have also recorded benefits to mental health and overall well-being for those who participate in regular cardiovascular activity. Many participants have access to outdoor trails, walks, running tracks, and other designated areas for exercise, including fitness clubs, gymnasiums, and exercise centers, but others cannot use these resources due to weather, costs, travel time, and home and family needs.

Over time, home exercise solutions have been developed to address the needs of fitness-conscious consumers who are home-bound, time-restricted, or budget-conscious. Home treadmills have allowed some consumers to bring running, jogging, and walking activities indoors, but are often a burden on the user due to their traditionally large size and weight, leaving few options for those with low available space and those who lack the strength to move around large and heavy machines. Many varieties of folding treadmills have been produced to allow a treadmill to compact into a smaller space when in a storage position. Such folding treadmills efficiently use space whether within a home or exercise center. However, even folding treadmills are not always convenient to place under existing furniture or within a small space within an office, home, or gym. The inclusion of a flywheel and electric motor is a significant factor in their size, contributing to a high profile of the treadmill, even while folded. Generally, treadmills also tend to have a high profile due to handlebars and status panel equipment adding thickness to the treadmill, even while stowed in a folded or collapsed position. The inclusion of wheels and other transportation features also tend to add thickness and weight to the treadmill.

One type of foldable exercise machine, including treadmills, is disclosed in U.S. Pat. No. 4,757,987 to Donald Allemand. This reference describes a treadmill that is portable by folding into a relatively compact size when not in use. The treadmill has telescoping handles that can be reduced in size and release tension on the belt of the base when turned downward. The base also folds in half for storage with the handle being placed on top of the belt halfway across its top surface.

U.S. Pat. No. 6,471,622 to Rodney L. Hammer describes a treadmill having a motorized tread base and a folding handrail that folds relative to the tread base such that the treadmill achieves a low profile when the handrail is in a folded position. The treadmill includes: (i) a tread base, the tread base comprising first and second rollers and an endless belt movably trained about the first and second rollers; (ii) a motor coupled to the tread base, the motor also being movably coupled to the first roller such that the motor selectively turns the first roller, thereby causing the belt to move; and (iii) a handrail pivotally coupled to the tread base, the handrail selectively folding with respect to the tread base. In a preferred embodiment, the treadmill is less than about 8 inches in height when the handrail is in a folded position. Other types of low profile exercise machines are described in, for example, U.S. Patent Application Publication No. 2013/0123073 to Michael Olson, et al., U.S. Pat. No. 6,033,347 to William T. Dalebout, et al., and U.S. Pat. No. 6,923,747 to Yong S. Chu. Each of the above mentioned references are herein incorporated by reference in their entireties.

SUMMARY

In a preferred aspect of the invention, a manually operated treadmill includes a deck with a tread belt encircling the deck to provide a movable, continuous running surface during operation of the treadmill and a transmission connecting a flywheel to the tread belt.

In one aspect of the invention that may be combined with one or more aspects set forth herein, a resistance unit is disposed to adjustably apply a resistance force to the inertial motion of the flywheel.

In one aspect of the invention that may be combined with one or more aspects set forth herein, the flywheel has an axis of rotation transverse to the running surface.

In one aspect of the invention that may be combined with one or more aspects set forth herein, the flywheel is disposed in front of the deck.

In one aspect of the invention that may be combined with one or more aspects set forth herein, the flywheel is disposed within a flywheel housing positioned in front of the deck.

In one aspect of the invention that may be combined with one or more aspects set forth herein, the resistance unit is a magnet.

In one aspect of the invention that may be combined with one or more aspects set forth herein, the resistance unit is a permanent magnet and the flywheel is a non-ferromagnetic metal.

In one aspect of the invention that may be combined with one or more aspects set forth herein, the resistance unit is a permanent magnet mounted on an actuation arm that is moved relative to the flywheel to adjust the resistance force.

In one aspect of the invention that may be combined with one or more aspects set forth herein, a manually operated treadmill includes a deck.

In one aspect of the invention that may be combined with one or more aspects set forth herein, a tread belt encircles the deck to provide a movable, continuous running surface during operation of the manually operated treadmill.

In one aspect of the invention that may be combined with one or more aspects set forth herein, the manually operated treadmill includes a flywheel.

In one aspect of the invention that may be combined with one or more aspects set forth herein, a transmission connects the flywheel to the tread belt.

In one aspect of the invention that may be combined with one or more aspects set forth herein, the flywheel has an axis of rotation transverse to the running surface.

In one aspect of the invention that may be combined with one or more aspects set forth herein, the manually operated treadmill includes a resistance unit disposed to adjustably apply a resistance force to an inertial motion of the flywheel.

In one aspect of the invention that may be combined with one or more aspects set forth herein, the resistance unit comprises a magnet.

In one aspect of the invention that may be combined with one or more aspects set forth herein, the resistance unit comprises a magnet and the flywheel comprises a non-ferromagnetic metal.

In one aspect of the invention that may be combined with one or more aspects set forth herein, a frame post pivotally connected to the deck, the frame post rotatable between an upright position and a storage position.

In one aspect of the invention that may be combined with one or more aspects set forth herein, the frame post is aligned with the running surface of the deck in the storage position.

In one aspect of the invention that may be combined with one or more aspects set forth herein, the frame post is transverse a length of the deck in the upright position.

In one aspect of the invention that may be combined with one or more aspects set forth herein, the exercise machine may further include that a portion of the tread belt is positioned to rotate around a pulley that is linked to the flywheel through a transmission that includes a with a drive belt.

In one aspect of the invention that may be combined with one or more aspects set forth herein, the frame post is transverse a length of the deck in the upright position.

In one aspect of the invention that may be combined with one or more aspects set forth herein, the manually operating treadmill includes one of a roller or a glider surface on at least one end of the deck.

In one aspect of the invention that may be combined with one or more aspects set forth herein, the one of a roller or a glider surface is suspended above a surface supporting the deck when the frame post is in the upright position.

In one aspect of the invention that may be combined with one or more aspects set forth herein, the manually operated treadmill includes a flywheel housing surrounding the flywheel, wherein the flywheel housing including a substantially transparent window.

In one aspect of the invention that may be combined with one or more aspects set forth herein, the frame post includes a first end and a second end.

In one aspect of the invention that may be combined with one or more aspects set forth herein, the frame post is pivotally connected to the deck between the first end and the second end such that the second end inclines the deck when the frame post is in the upright position.

In one aspect of the invention that may be combined with one or more aspects set forth herein, the flywheel generates electrical power in response to a rotation of the flywheel.

In one aspect of the invention that may be combined with one or more aspects set forth herein, the manually operated treadmill directs the electrical power generated by the flywheel to at least one of a console of the manually operated treadmill and the resistance unit.

In one aspect of the invention that may be combined with one or more aspects set forth herein, the resistance unit comprises an eddy current brake.

In one aspect of the invention that may be combined with one or more aspects set forth herein, the exercise machine may further include a brake selectively resists flywheel motion due to eddy currents generated by rotation of the flywheel.

In one aspect of the invention that may be combined with one or more aspects set forth herein, a portion of the tread belt is positioned to rotate around a pulley that is linked to the flywheel with a linking member.

In one aspect of the invention that may be combined with one or more aspects set forth herein, the transmission includes a pulley rotatably connected to the tread belt.

In one aspect of the invention that may be combined with one or more aspects set forth herein, the transmission includes a linking member rotatably connecting the pulley to the flywheel.

In one aspect of the invention that may be combined with one or more aspects set forth herein, the frame post at least in part supports a rotatable console, the rotatable console being rotatable such that the console is aligned with a length of the frame post in a storage position.

In one aspect of the invention that may be combined with one or more aspects set forth herein, the flywheel generates electrical power in response to a rotation of the flywheel.

In one aspect of the invention that may be combined with one or more aspects set forth herein, the exercise machine directs the electrical power generated by the flywheel to one of the console or the resistance unit.

In one aspect of the invention that may be combined with one or more aspects set forth herein, the exercise machine may further include a roller on at least one end of the deck.

In one aspect of the invention that may be combined with one or more aspects set forth herein, the roller is suspended above a surface supporting the deck when the frame post is in the upright position.

In one aspect of the invention that may be combined with one or more aspects set forth herein, the exercise machine may further include that a glider surface affixed to at least one end of an underside of the deck.

In one aspect of the invention that may be combined with one or more aspects set forth herein, an exercise machine includes a deck.

In one aspect of the invention that may be combined with one or more aspects set forth herein, the exercise machine includes a tread belt integrated into the deck.

In one aspect of the invention that may be combined with one or more aspects set forth herein, a manually operated flywheel integrated into the deck where the flywheel is interconnected with the tread belt to maintain inertial motion of the tread belt.

In one aspect of the invention that may be combined with one or more aspects set forth herein, the deck has a running surface and the flywheel has an axis of rotation transverse to a running surface.

In one aspect of the invention that may be combined with one or more aspects set forth herein, the exercise machine may further include a frame post pivotally connected to the deck, the frame post rotatable between an upright position and a storage position.

In one aspect of the invention that may be combined with one or more aspects set forth herein, the frame post has a first end and a second end, and the frame post is pivotally connected to the deck between the first end and the second end such that the second end inclines the deck when the frame post is in an upright position.

In one aspect of the invention that may be combined with one or more aspects set forth herein, the frame post is transverse a length of the deck in the upright position.

In one aspect of the invention that may be combined with one or more aspects set forth herein, the frame post is aligned with a running surface of the deck in the storage position.

In one aspect of the invention that may be combined with one or more aspects set forth herein, the exercise machine may further include a brake selectively resists flywheel motion due to eddy currents generated by rotation of the flywheel.

In one aspect of the invention that may be combined with one or more aspects set forth herein, a portion of the tread belt is positioned to rotate around a pulley that is linked to the flywheel with a linking member.

In one aspect of the invention that may be combined with one or more aspects set forth herein, the frame post at least in part supports a rotatable console, the rotatable console being rotatable such that the console is aligned with a length of the frame post in a storage position.

In one aspect of the invention that may be combined with one or more aspects set forth herein, the flywheel generates electrical power in response to a rotation of the flywheel.

In one aspect of the invention that may be combined with one or more aspects set forth herein, the exercise machine directs the electrical power generated by the flywheel to the console.

In one aspect of the invention that may be combined with one or more aspects set forth herein, the exercise machine may further include a glider surface affixed to at least one end of an underside of the deck.

In one aspect of the invention that may be combined with one or more aspects set forth herein, a manually operated treadmill includes a deck.

In one aspect of the invention that may be combined with one or more aspects set forth herein, the manually operated treadmill includes a tread belt encircling the deck to provide a movable, continuous running surface during operation of the manually operated treadmill.

In one aspect of the invention that may be combined with one or more aspects set forth herein, the manually operated treadmill includes a flywheel.

In one aspect of the invention that may be combined with one or more aspects set forth herein, the manually operated treadmill includes a resistance unit disposed to adjustably apply a resistance force to an inertial motion of the flywheel.

In one aspect of the invention that may be combined with one or more aspects set forth herein, the manually operated treadmill includes a transmission connecting the flywheel to the tread belt.

In one aspect of the invention that may be combined with one or more aspects set forth herein, the flywheel has an axis of rotation transverse to the running surface.

Any of the aspects of the invention detailed above may be combined with any other aspect of the invention detailed herein.

BRIEF DESCRIPTION OF THE DRAWINGS

The accompanying drawings illustrate various embodiments of the present apparatus and are a part of the specification. The illustrated embodiments are merely examples of the present apparatus and do not limit the scope thereof.

FIG. 1a illustrates a perspective view of an example exercise machine in accordance with the present disclosure.

FIG. 2 illustrates a side view of an example exercise machine with a console in a storage position in accordance with the present disclosure.

FIG. 4 illustrates a side view of an example exercise machine with a frame post in a storage position in accordance with the present disclosure.

FIG. 5 illustrates a side view of an example exercise machine with a frame post in a storage position and a console removed in accordance with the present disclosure.

FIG. 6 illustrates a bottom perspective view of an example exercise machine in a storage position in accordance with the present disclosure.

FIG. 7 illustrates a top view of an example tread belt with a flywheel in accordance with the present disclosure.

FIG. 8 illustrates a side view of an example tread belt with a flywheel in accordance with the present disclosure.

Throughout the drawings, identical reference numbers designate similar, but not necessarily identical, elements.

DETAILED DESCRIPTION

Figure 1B:
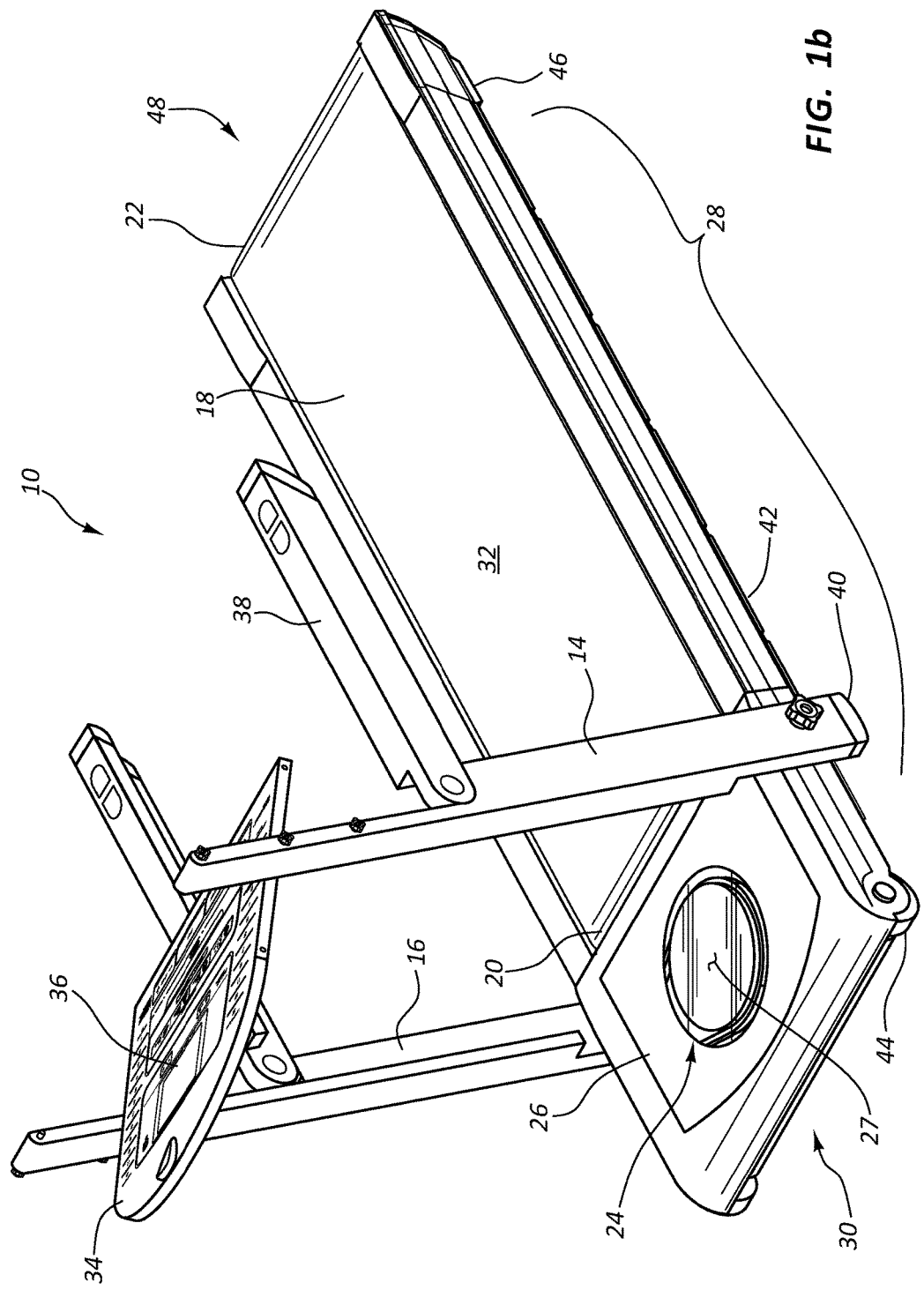
FIG. 1b illustrates a perspective view of an example exercise machine in accordance with the present disclosure.

Exercise machines, such as treadmills, take up space when they are not used. To minimize the space occupied by such exercise machines during periods of non-use, the running decks and frame are often constructed to fold into one another such that the running deck is in a storage position. However, folding the frame down into the running deck still results in the folded treadmill occupying a significant amount of floor space. To compensate, the folded treadmill or other type of exercise machine is often lifted upright so that the running deck or other type of exercise platform stands vertically in a storage position. The running deck is often heavy and awkward to move.

For purposes of this disclosure, the term "aligned" means parallel, substantially parallel, or forming an angle of less than 25 degrees. For purposes of this disclosure, the term "transverse" means perpendicular, substantially perpendicular, or forming an angle between 65 and 115 degrees. For purposes of this disclosure, the term "manually operated" means driven primarily by human, rather than motorized or electrical energy.

Particularly, with reference to the figures, FIG. 1a depicts an exercise machine 10, such as a treadmill. The exercise machine 10 includes a running deck 12 that can support the weight of a user and that is attached to a first frame post 14 and a second frame post 16. The running deck 12 incorporates a tread belt 18 that extends from a first pulley 20 to a second pulley (not shown) at location 22. The underside of the tread belt's mid-section is supported by a low friction surface that allows the tread belt's underside to move without creating significant drag.

The movement of the tread belt 18 can be powered by the user running or walking on the tread belt 18. A flywheel 24 is located in a flywheel housing 26 positioned at the front of the exercise machine 10. In some examples, the flywheel housing 26 is incorporated into the running belt adjacent to the tread belt 18 such that the flywheel housing 26 extends the length 28 of the running deck 12. However, in other examples, the flywheel 24 and/or flywheel housing 26 may be incorporated in the rear portion 48 of the exercise machine 10, incorporated into the underside of the running deck 12, incorporated into a mid-section of the running deck 12, positioned between the first and second frame posts 14, 16, positioned elsewhere in the exercise machine 10, or combinations thereof. In some examples, the flywheel 24 has an axis of rotation that is transverse to the running surface 32 of the running deck 12. In some of such examples, the running surface 32 and the flywheel 24 are parallel or substantially parallel. Further, the flywheel 24 may be located within the same plane as the running deck 12.

In some examples, the flywheel housing 26 includes a substantially transparent window covering 27 that allows the flywheel 24 to be visible during operation. The window covering 27 may be made of a clear acrylic material or another type of transparent material. In some examples, the window covering 27 is made with a material that is strong enough to withstand the user stepping on the flywheel housing 26 during the workout or while mounting and/or dismounting the exercise machine 10.

As a user runs or walks on the tread belt 18, the tread belt 18 may be moved in a circulating manner around the first and second pulleys. Either the first pulley 20 or the second pulley may be linked to the flywheel 24 through at least one linking member. A linking member may include a drive belt, a drive chain, a flat belt, a gear assembly, a cable, a V-belt, a rope belt, a round belt, a ribbed belt, a film belt, a groove belt, a friction belt, another type of linking member, or combinations thereof. Since the axis of rotation for the pulleys and the axis of rotation for flywheel 24 may be transverse to one another, the orientation of the linking member may be twisted or rotated to accommodate the different orientations of the axes of rotation. In some examples, multiple linking members are used with orienting members that change the angle of the power transmitted by the linking members such that the power transmitted off of the pulleys can be oriented to transmit power to rotate the flywheel 24.

In some examples, there is no motor or external electrical power source to drive the tread belt 18. In such examples, the tread belt 18 may be solely man powered. The flywheel 24 provides inertia to maintain movement of the tread belt 18 as the user walks or runs on the running deck 12. Also, the flywheel 24 may generate eddy currents for electrical power as the flywheel 24 rotates. This generated power may be directed towards a console 34 or other components of the exercise machine 10. In some examples, the electrical power can be used to resist movement of the flywheel 24 if the user desires to have resistance in his or her workout.

In the example of FIG. 1b, the console 34 is supported between the first and second frame posts 14, 16. In some examples, the console 34 is pivotally attached so that the console 34 can be rotated into an operating position and a storage position. In the illustrated example, the console 34 is depicted in the operating position where the console 34 is angled at a degree convenient for the user to view during a workout. The console 34 may allow the user to perform a predetermined task while simultaneously operating the exercise machine 10. The console 34 may include controls to adjust a volume of a speaker integrated into the exercise machine 10, control a timer, change a view on the console's display 36, monitor the user's health parameters, perform other tasks, or combinations thereof. Buttons, levers, touch screens, voice commands, or other mechanisms may be incorporated into the console 34 and may be used by the user to control at least some of the functions mentioned above. Information relating to these functions may be presented to the user through the display 36. For example, a calorie count, a timer, a distance, a selected program, another type of information, or combinations thereof may be presented to the user through the display 36.

In some examples, the first and second frame posts 14, 16 include hand holds 38 that can be folded down as desired by the user. In some examples, a user can grip the hand holds 38 during a workout for stability or to access an instrument incorporated into the hand holds 38, such as electrodes for a heart rate monitor.

The first and second frame posts 14, 16 may include feet 40 that stabilize the exercise machine 10 when the frame posts 14, 16 are in the upright position. The feet 40 extend below the underside 42 of the running deck 12 when in the upright position. As a result, the front portion 30 of the exercise machine 10 is lifted off of the floor that supports the running deck 12 and inclines the running deck 12 when the frame posts 14, 16 are in the upright position. Consequently, rollers 44, glider surfaces, or other friction reducing elements that are incorporated into the underside 42 of the front portion 30 of the exercise machine 10 are lifted up such that they have no contact with the floor. The feet 40 may include grips or other features constructed to increase friction between the floor and the exercise machine 10 to add stability during a workout. In some examples, the exercise machine 10 may include a locking mechanism that locks the first and second frame posts 14, 16 into the upright position.

In the illustrated example, each of the components are in either an upright position or an operating position to enable a user to operate each component during a workout. However, some of the components of the exercise machine 10 can be moved into storage positions. The exercise machine 10 may be compact enough when the components are in their storage positions to enable a user to slide the exercise machine 10 under a bed or into another small storage area.

FIG. 2 illustrates a side view of the exercise machine 10 with a console 34 in a storage position in accordance with the present disclosure. In this example, the console 34 is rotated upwards such that the console 34 is aligned with the first and second frame posts 14, 16. In some examples, the console 34 is connected to the frame posts 14, 16 through a single pivot rod that is connected to the first frame post 14 on a first end and connected to the second frame post 16 at a second end. The console 34 may be rotated by hand into either the storage position or the operating position. In some examples, a locking mechanism may be incorporated into the exercise machine 10 to lock the console 34 into the storage position and/or the operating position.

While this example has been described with reference to a specific arrangement for positioning the console 34, any appropriate arrangement for positioning the console 34 may be used in accordance with the principles described in the present disclosure. For example, pivot rods, sliders, hinges, fasteners, another types of mechanisms, or combinations thereof may be used to allow the console 34 to switch between the storage position and the operating position.

Figure 3:
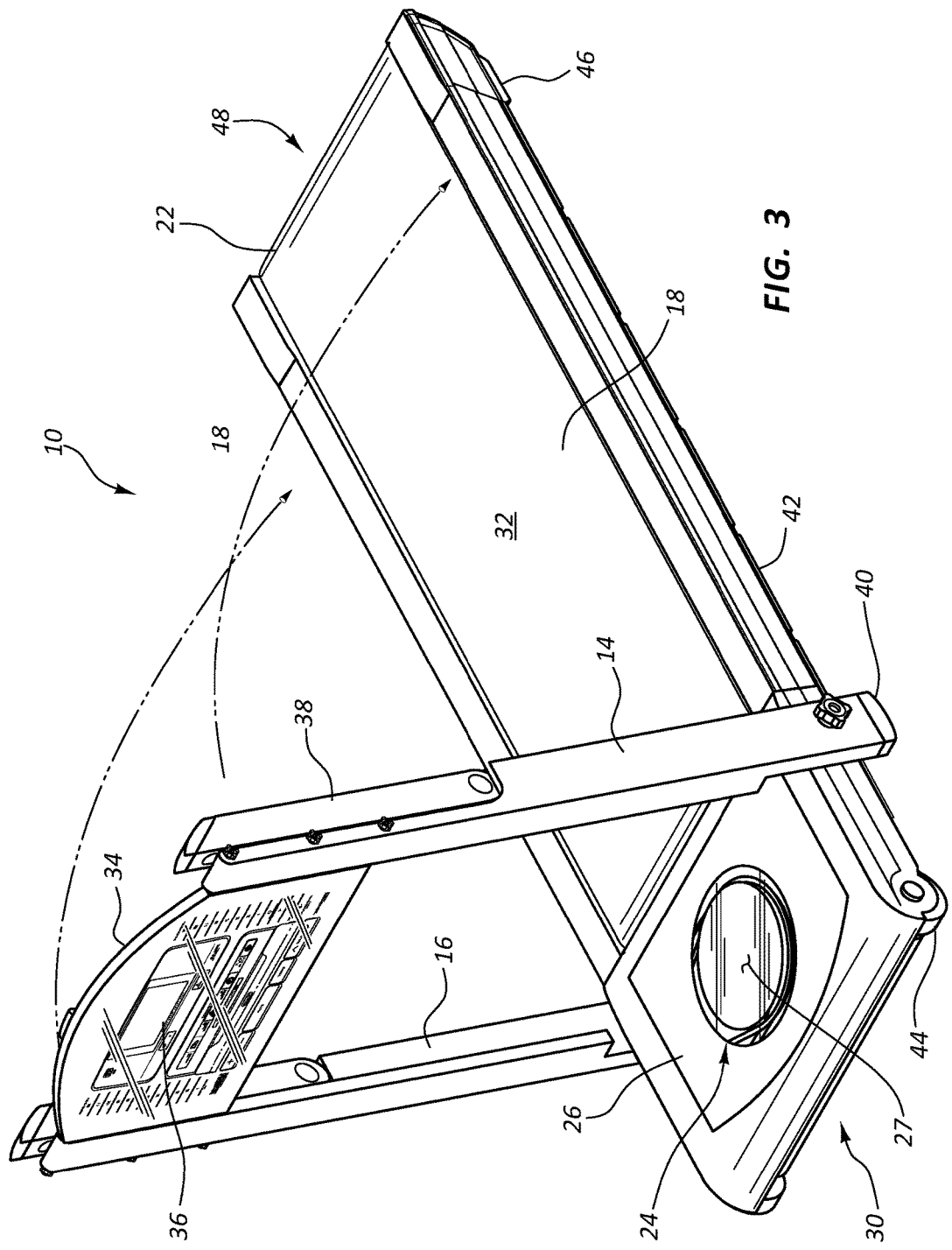
FIG. 3 illustrates a perspective view of an example exercise machine with hand holds in a storage position in accordance with the present disclosure.

FIG. 3 illustrates a perspective view of the exercise machine 10 with hand holds 38 in a storage position in accordance with the present disclosure. In this example, the console 34 is rotated into the storage position. Additionally, as illustrated, the hand holds 38 are rotated into the storage position. The hand holds 38 may be secured to the frame posts 14, 16 with a pivot joint such that the hand holds 38 can be moved into either the storage position or the operating position by hand. In some examples, a locking mechanism may be incorporated into the exercise machine 10 to lock the hand holds 38 into the storage position and/or the operating position.

While this example has been described with reference to a specific arrangement for positioning the hand holds 38, any appropriate arrangement for positioning the hand holds 38 may be used in accordance with the principles described in the present disclosure. For example, pivot rods, sliders, hinges, fasteners, other types of mechanisms, or combinations thereof may be used to allow the hand holds 38 to switch between the storage position and the operating position.

FIG. 4 illustrates a side view of the exercise machine 10 with a frame post in a storage position in accordance with the present disclosure. In this example, first and second posts 14, 16 are folded down into the storage position such that the frame posts 14, 16 are aligned with the length 28 of the running deck 12. Likewise, the hand holds 38 and the console 34 are brought into alignment with the length 28 of the running deck 12.

While the frame posts 14, 16 are in the storage position, the feet 40 are also rotated up. As a result, the rollers 44 incorporated into the underside 42 of the exercise machine 10 are allowed to be in contact with the floor. Also, in the example of FIG. 4, a glider surface 46 is incorporated into the rear portion 48 of the underside 42 of the running deck. With the feet 40 retracted, the rollers 44 and the glider surfaces 46 reduce friction between the floor and the exercise machine 10 enabling a person to more easily move the exercise machine 10. Particularly, the exercise machine 10 is configured to be rolled or slid into any number of storage spaces.

The glider surface 46 may extend away from the underside 42 of the running deck 12 so that most or all of the weight of the exercise machine 10 is loaded to either the glider surfaces 46 or to the rollers 44. The glider surface 46 may have a smooth, flat surface with a sufficiently large surface area to spread the weight of the rear portion 48 of the exercise machine 10 across sufficient floor surface area to minimize or eliminate scrapping or grooving the floor as the exercise machine 10 is slid across the floor, and prevent a point load that would increase friction and inhibit the movement of the exercise machine 10 across the floor. The glider surface 46 may be made of any appropriate combination of surface materials and/or geometry that reduces the friction between the exercise machine 10 and the floor upon which the exercise machine 10 rests. The glider surface 46 may be made of steel, aluminum, plastic, polymers, fluoropolymers, wood, and/or any other type of appropriate material, or combinations thereof. In some examples, the glider surface 46 has a flat portion and an outer portion that is tapered upward and away from flat portion to accommodate an uneven floor surface as the exercise machine 10 slides.

FIG. 5 illustrates a side view of the exercise machine 10 with a frame post in a storage position and the console 34 removed in accordance with the present disclosure. In this example, the console 34 is removable. Thus, the console 34 may be stored separately, next to the exercise machine 10, or on a different location of the exercise machine. The console 34 may be removed in those situations where the height of the storage space available under the bed or other type of storage space is insufficient to accommodate the height of the exercise machine 10 with the console 34 attached. In such situations, the console 34 can be removed and allow the exercise machine 10 to be stored in a shorter storage space.

The console 34 may be attached to the first and second frame posts 14, 16 by any appropriate mechanism. For example, the console 34 may be removable by unthreading or undoing fasteners which hold the console 34 in place. In other examples, the console 34 is shaped to snap into a geometry formed by the frame posts 14, 16. In yet other examples, the console 34 may slide off of and/or away from the frame posts 14, 16 for removal. The removal mechanism may be simple and constructed to allow the console 34 to conveniently detach from the frame posts 14, 16.

FIG. 6 illustrates a bottom perspective view of the exercise machine 10 in a storage position in accordance with the present disclosure. In this example, the glider surface 46 is depicted at corners of the rear portion 48 of the exercise machine 10. Further, the rollers 44 are also depicted at the corners of the front portion 30 of the exercise machine 10.

In other examples, the rollers 44 may be placed in the corners of the rear portion 48, and the glider surfaces 46 are positioned at the corners of the front portion 30. In yet other examples, rollers 44 are affixed to each of the corners. In yet an additional example, the glider surfaces 46 are affixed to each of the corners. While these examples describe the rollers 44 and/or glider surfaces 46 being positioned at the corners of the underside 42, the rollers 44 and/or glider surfaces 46 may be positioned at any appropriate location of the underside 42, and may have alternative geometries, such as an oval or circular geometry. For example, a roller and/or glider surface 46 may be positioned along a perimeter of the underside 42, a center of the underside 42, another location in the underside 42, or combinations thereof.

FIGS. 7 and 8 illustrate an exercise machine 10 with a tread belt 18 and a flywheel 24 with both the running deck covering and the flywheel housing 26 removed. FIG. 7 depicts the exercise machine 10 from a top view, while FIG. 8 depicts the exercise machine 10 from a side view. The running deck 12 include a tread belt 18 that circumscribes a first pulley 20 and a second pulley 50. A transmission 52 transmits power from the rotation of the first pulley 20 to the flywheel 24. Alternatively, the second pulley 50 is linked to the flywheel 24. The transmission 52 includes a first linking member 54 and a second linking member 56 that are linked together with an orienting mechanism 58. The orienting mechanism 58 can be configured to orient the first linking member 54 with the first pulley 20 and to orient the second linking member 56 with the flywheel 24 while allowing the first linking member 54 to transfer power to the second linking member 56.

The orienting mechanism 58 may incorporate any appropriate type of mechanism that allows for the proper orientation of the first and second linking members 54, 56 while maintaining the power transfer between them. In the illustrated example, the first and second linking members 54, 56 are belts, and the orienting mechanism 58 includes a cylindrical shaft about which both the first and second linking members 54, 56 transfer torque. The orienting mechanism 58 is spaced a distance away from the first pulley 20 such that the first linking member 54 can be twisted to rotate about both the first pulley 20 and the orienting mechanism 58 even though the first pulley 20 and the orienting mechanism 58 rotate about orthogonal axes. In other examples, the orienting mechanism 58 includes gears, beveled gears, chains, shafts, other devices, or combinations thereof.

In the illustrated example, the power from the movement of the tread belt 18 is transferred to the flywheel 24 off of a first side 60 of the second pulley 50. However, in other examples, the power may be transferred to the flywheel 24 from both sides. In such an example, a third linking member may be rotatable with a second side 62 of the first pulley 20. Such a third linking member may also be configured to rotate a second orienting member that is also in mechanical communication with the second linking member 56.

In FIG. 7, a resistance unit in the form of a magnetic unit 80 is positioned proximate the flywheel 24. The magnetic unit 80 includes an arm 82 and a magnet 84 mounted on the arm 82 that can be pivoted closer to or farther away from the flywheel 24. As the magnet 84 gets closer to the flywheel 24, the magnetic field imposes a greater resistance to the rotation of the flywheel 24. As the magnet 84 gets farther away from the flywheel 24, the resistance imposed by the magnetic field weakens. The magnet 84 may be a permanent magnet. Thus, the resistance to the rotation of the flywheel 24 and therefore the movement of the tread belt can be varied. An actuator can be used to move the arm 82 relative to the flywheel 24. Such actuators may include a hydraulic mechanism, a pneumatic mechanism, an electrical mechanism, another type of mechanism, or combinations thereof. Such actuators may be powered through a battery, a current supplied from the grid, from movement of the user operating the treadmill, another source, or combinations thereof. In some examples, the flywheel is made of a magnetic material or at least includes a magnetic component. In other examples, the flywheel is made of a non-ferromagnetic material, such as aluminum or another type of material where the material's movement is resisted as it passes through a magnetic field.

Figure 9A:
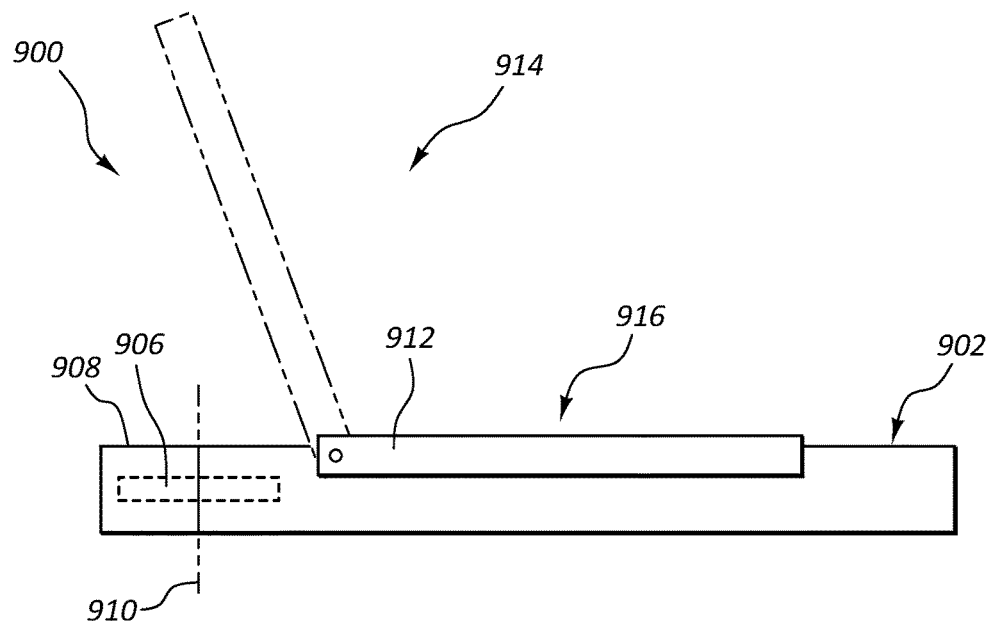
FIG. 9a illustrates a side view of an example of an exercise machine with a flywheel in accordance with the present disclosure.

FIG. 9a depicts an exercise machine 900 having a deck 902 with a tread belt and a manually operated flywheel 906. The deck 902 has a running surface 908. The flywheel 906 has an axis 910 of rotation transverse to the running surface 908. The flywheel 906 is operative to maintain inertial motion of the tread belt. A frame post 912 is pivotally connected to the deck 902. The frame post 912 is also rotatable between an upright position 914 and a storage position 916. The frame post 912 is aligned with the running surface 908 of the deck 902 when in the storage position 916.

Figure 9B:
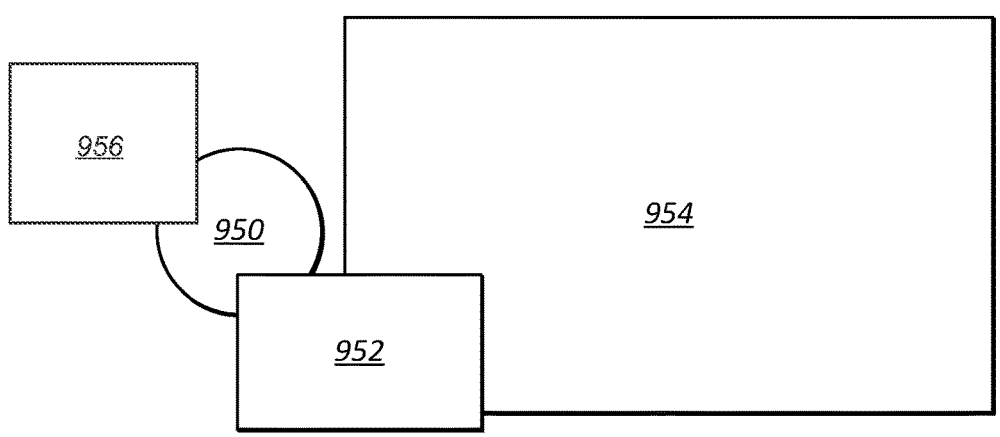
FIG. 9b illustrates a top view of an example of an exercise machine with a flywheel in accordance with the present disclosure.

FIG. 9b depicts an exercise machine 900 that includes a tread belt 954 connected to a flywheel 950 through a transmission 952. A resistance unit 956 that can selectively resist the movement of the flywheel 950. Any appropriate type of transmission 952 may be used in accordance with the principles described in the present disclosure. For example, the transmission may include a drive belt, a chain, a gear train, a strap, shafts, another type of linking member, or combinations thereof.

INDUSTRIAL APPLICABILITY

In general, the disclosed system and method may provide the user with an ability to use exercise machines, such as treadmills, and be able to easily move and store them in low volume spaces.

The principles described herein include an exercise machine, such as a treadmill, that can fold into a compact size sufficient to slide under a bed or into another small area. The exercise machine has a running deck and a flywheel. The flywheel's axis of rotation is transverse to the running surface of the tread belt. In some examples, the flywheel and the tread belt reside in the same plane.

In some examples, the axis of rotation of the flywheel forms a 90.0 degree angle with the running surface of the running deck. In other examples, the axis forms an angle between 85.0 and 95.0 degrees. In yet other examples, the axis forms an angle between 80.0 and 100.0 degrees. In additional examples, the axis forms an angle between 75.0 and 105.0 degrees. In further examples, the axis forms an angle between 70.0 and 110.0 degrees. In more examples, the axis forms an angle between 65.0 and 115.0 degrees.

The exercise machine's weight is minimized by reducing and/or eliminating a drive motor from the exercise machine. The flywheel resists changes in the velocity of a tread belt, thereby adding initial resistance, and aiding in maintaining rotational inertia during exercise. In some examples, the relative movement of the flywheel can be used to generate electrical power that can be used to power electrical components of the exercise machine, such as a display, a controller, and/or a resistance unit.

Electrical components powered by the flywheel may execute functions such as tracking a distance traveled, determining a speed of the user, tracking a heart rate of the user, tracking a calorie count, selectively adding resistance to the flywheel, performing other functions, and combinations thereof. For example, the electrical power may be generated by providing a coil of electrically conductive material to be proximate at least a portion of the flywheel where portions of the flywheel produce a magnetic field (i.e. a magnet or an electrically controlled magnetic device). As the magnetic field is caused to move with respect to the coils, an electrical current is generated that can be directed to the console or a power storage, such as a battery. The power storage may be used to supply power to the components of the console when the user is just starting to use the treadmill or when the user temporarily stops using the treadmill.

A console of the disclosed exercise machine may implement the electrical functions mentioned above. In some examples, the console may detach from the frame of the exercise machine when the exercise machine is folded into a storage position. In other examples, the console folds down between frame posts such that the console is aligned with the length of the frame posts. The frame posts also pivot downward such that the frame posts are aligned with the running deck. In examples where the console folds into the frame posts, the console also aligns with the running deck when the frame posts are aligned with the running deck.

In the storage position, the exercise machine can be moved relatively easy on rollers and/or glider surfaces incorporated into the underside of the deck. However, when the frame posts are in the upright position, the bottom ends of the frame posts may push off of the surface upon which the running deck resides, thereby inclining the running deck. As a result, the front end of the exercise machine is raised off of the ground, and the rollers and/or glider surfaces incorporated in the underside of the front end of the running deck are raised off of the surface and suspended in the air. Further, when the bottom ends of the frame posts are in the upright position, the bottom ends contact the floor and substantially increase the amount of friction between the surface and the underside of the running deck. This increased friction stabilizes the running deck when the exercise machine is ready for operation.

As mentioned above, the flywheel can be oriented to minimize the vertical height of the exercise machine while in the storage position. In some cases, the flywheel has an axis of rotation that is transverse to the running surface of the running deck, which can minimize the overall storage height of the exercise machine. In some examples, the flywheel and the running deck are parallel or substantially parallel to each other. In some cases, the flywheel may be oriented between zero and 45 degrees off of the running deck. Further, the flywheel may be located in the same plane with the running deck. In some cases, the flywheel and the running deck are enclosed within the same housing.

The treadmill may include a tread belt that surrounds a first and second pulley. At least one of the pulleys may be linked to the flywheel through an appropriate mechanism. For example, a linking member or a transmission may connect the pulley to the flywheel. The linking member or components of the transmission may include a chain, a cord, a cable, a belt, a rope, a strap, a gear chain, another type of linking member, or combinations thereof. Further, an intermediate member may be used to orient multiple linking members in a transmission. For example, a first belt may connect the flywheel to the intermediate member and a second belt may connect the pulley to the intermediate member. The first and second belts may be sufficiently twisted that their first ends are oriented to connect with the intermediate member while their second ends are oriented to be connected to the axles of the pulley and flywheel, which are not aligned. For example, the axles of the pulley and the flywheel may be orthogonal to each other. Thus, one or more linking members may be twisted or otherwise oriented to connect the axles of the pulley and the flywheel even though the axles are oriented transverse to one another.

The exercise machine as described above also provides the benefit of being self-powered. The user can move the tread belt by walking or running on the running deck. The power generated by the movement of the tread belt is transferred to the flywheel. The flywheel can provide inertia to keep the tread belt moving as the user continues to walk and/or run. This allows the user to run or walk at a pace that is comfortable for the user instead of the user having to select between predetermined speed levels that may or may not be well suited for the user.

In some examples, the flywheel can be used to generate electrical power to operate components of the exercise machine. Additionally, a resistance or braking unit may be incorporated into the flywheel if the user desires to incorporate resistance into his or her workout. Such a resistance unit may be a magnetic braking mechanism that includes a magnet that exposes at least a portion of the flywheel to a magnetic field. Such a magnetic field may selectively resist the rotation of the flywheel. The amount of magnetic resistance applied to the flywheel may be controlled by moving the position of the magnet closer to the flywheel to increase the magnetic resistance. Further, the position of the magnet may be moved farther away from the flywheel to decrease the magnetic resistance. Other types of magnetic resistance units may be used. For example, the resistance may be applied through a compression or friction based mechanism involving friction based brake pads. The resistance unit may be applied through an electrically actuated mechanism, a pneumatic mechanism, a hydraulic mechanism, another type of mechanism, or combinations thereof. Additionally, as noted above, the power for the actuation mechanism of the resistance unit may be generated by the manual operation of the flywheel itself.

The exercise machine is also equipped with rollers and/or glider surfaces which make the exercise machine easy to slide or otherwise move across a floor. In some examples, the rollers are affixed to the front portion of the treadmill. The rollers may be attached to the front portion so that the user may lift the rear portion of the treadmill and load the weight of the treadmill through the rollers when the treadmill is in the storage position. In such a circumstance, the rollers may be rotatably affixed to the front portion so that as the user pushes or pulls on the rear portion of the treadmill, that the rollers reduce the friction between the ground and the front portion of the treadmill allowing the user to more easily move the treadmill. In some examples, the rollers may be affixed to the front portion and/or rear portion of the treadmill. Likewise, gliders may be affixed to the front portion and/or rear portion of the treadmill. In a similar fashion, the gliders may also reduce the friction between the ground and the treadmill.

However, friction between the floor and the exercise machine is increased sufficiently to stabilize the position of the treadmill with respect to ground when the frame posts are in the upright position. In some examples, when the frame posts are in the upright position, the feet of the frame posts extend below the underside of the tread deck thereby causing the feet of the frame posts to lift the front portion of the exercise machine off of the ground. Thus, a gap between the underside of the treadmill and the ground is formed preventing the rollers, gliders, or other features used to reduce friction from having contact with the ground. As a result, with the running deck in the inclined position, the rollers or glider surfaces incorporated into the front portion of the underside are also lifted off of the ground. Thus, the weight of the front portion of the treadmill is loaded to the ground through the feet of the frame posts. The feet may be constructed to grip the floor. As a result, the feet provide stability when the user is actually performing a workout on the exercise machine.

In some circumstances, the rear portion of the treadmill may also include feet that are pivotally attached or otherwise attached to the rear portion of the treadmill that can be used to elevate the rear portion of the treadmill off of the ground. By elevating the rear portion off of the ground, friction reducing features such as gliders, rollers, or other features, are prevented from making contact with the ground to provide additional stability to the treadmill. However, such feet attached to the rear portion of the treadmill may be rotated inward or otherwise moved to cause the feet to align with the orientation of the treadmill reducing the vertical height of the treadmill's rear portion.

Each of the movable parts of the exercise machine allow the machine to be compacted for storage in small storage space. Locking mechanisms may be used to secure these movable parts in the storage position for moving the exercise machine. Further, locking mechanisms may also be implemented to secure the movable parts in the operating or upright positions to add stability to the exercise machine during a workout.

The flywheel housing may include a substantially transparent window covering that allows the flywheel to be visible during operation. The window covering may be made of a clear acrylic material or another type of transparent material. In some examples, the window covering is made with a material that is strong enough to withstand the user stepping on the flywheel housing during the workout or while mounting and/or dismounting the exercise machine. In some cases, the ability of the user to see the rotation of the flywheel through the transparent window gives the user motivation during the workout. Such motivation may give the user additional determination to increase his or her speed or to maintain a desired speed for a longer duration of time. In some cases, the window is semi-transparent allowing the user to see the profile of the flywheel while obscuring some of the flywheel's details.

What is claimed is:

1. A manually operated treadmill, comprising:
a deck;
a first pulley incorporated into the deck;
a second pulley incorporated into the deck;
a tread belt encircling the first pulley and the second pulley to provide a movable, continuous running surface during operation of the manually operated treadmill;
a housing positioned in front of the deck;
a flywheel located within the housing, in front of the tread belt, and being oriented to rotate about an axis that is orthogonal with respect to an axis of rotation of at least one of the first pulley and the second pulley;
a transmission connecting the flywheel to the tread belt; and a resistance unit disposed to adjustably apply a resistance force to an inertial motion of the flywheel, wherein the resistance unit comprises a permanent magnet and the flywheel comprises a non-ferromagnetic metal, wherein the permanent magnet is mounted on an actuation arm that moves relative to the flywheel to adjustably apply the resistance force to the flywheel;
wherein the flywheel has an axis of rotation transverse to the running surface.

2. The manually operated treadmill of claim 1, further comprising a frame post pivotally connected to the deck, the frame post rotatable between an upright position and a storage position;
wherein the frame post is aligned with the running surface of the deck in the storage position; and
wherein the frame post is transverse a length of the deck in the upright position.

3. The manually operated treadmill of claim 2, further comprising one of a roller or a glider surface on at least one end of the deck;
wherein the one of the roller or the glider surface is suspended above a surface supporting the deck when the frame post is in the upright position.

4. The manually operated treadmill of claim 2, wherein:
the frame post includes a first end and a second end; and
the frame post is pivotally connected to the deck between the first end and the second end such that the second end inclines the deck when the frame post is in the upright position.

5. The manually operated treadmill of claim 2, wherein the frame post includes one or more hand holds that are configured to fold down.

6. The manually operated treadmill of claim 1, wherein the flywheel generates electrical power in response to a rotation of the flywheel, wherein the manually operated treadmill directs the electrical power generated by the flywheel to at least one of a console of the manually operated treadmill and a resistance unit.

7. The manually operated treadmill of claim 6, wherein the flywheel is parallel to the running surface.

8. The manually operated treadmill of claim 1, wherein the resistance unit comprises a magnet.

9. The manually operated treadmill of claim 1, wherein the resistance unit comprises an eddy current brake.

10. The manually operated treadmill of claim 1, wherein the transmission comprises:
a pulley rotatably connected to the tread belt; and
a linking member rotatably connecting the pulley to the flywheel.

11. The manually operated treadmill of claim 1, wherein the housing includes a substantially transparent window allowing the flywheel to be visible during operation.

12. The manually operated treadmill of claim 1, the vertical height of the manually operated treadmill is less than eight inches in a storage position.

13. A manually operated treadmill, comprising:
a deck;
a first pulley incorporated into the deck;
a second pulley incorporated into the deck;
a tread belt encircling the first pulley and the second pulley to provide a movable, continuous running surface during operation of the manually operated treadmill;
a housing positioned in front of the deck;
a flywheel located within the housing, in front of and within the same plane as the tread belt, and being oriented orthogonally with respect to at least one of the first pulley and the second pulley, wherein the housing includes a substantially transparent window allowing the flywheel to be visible during operation;
a resistance unit disposed to adjustably apply a resistance force to an inertial motion of the flywheel; and
a transmission connecting the flywheel to the tread belt.

14. The manually operated treadmill of claim 13, wherein the flywheel has an axis of rotation transverse to the running surface.

15. The manually operated treadmill of claim 13, the vertical height of the manually operated treadmill is less than eight inches in a storage position.

16. A manually operated treadmill, comprising:
a deck;
a first pulley incorporated into the deck;
a second pulley incorporated into the deck;
a tread belt encircling the first pulley and the second pulley to provide a movable, continuous running surface during operation of the manually operated treadmill;
a housing positioned in front of the deck, the housing includes a substantially transparent window allowing the flywheel to be visible during operation;
a flywheel located within the housing and being oriented to rotate about an axis that is orthogonal with respect to an axis of rotation of at least one of the first pulley and the second pulley; and
a transmission connecting the flywheel to the tread belt;
wherein the flywheel has an axis of rotation transverse to the running surface.

* * * * *